(12) United States Patent
Kawano et al.

(10) Patent No.: US 10,563,768 B2
(45) Date of Patent: Feb. 18, 2020

(54) INTERNAL COMBUSTION ENGINE

(71) Applicant: AISIN SEIKI KABUSHIKI KAISHA, Kariya-shi, Aichi-ken (JP)

(72) Inventors: Ichiro Kawano, Kariya (JP); Yuji Iwata, Kariya (JP); Akihiro Katsumata, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 40 days.

(21) Appl. No.: 15/814,744

(22) Filed: Nov. 16, 2017

(65) Prior Publication Data

US 2018/0142788 A1 May 24, 2018

(30) Foreign Application Priority Data

Nov. 18, 2016 (JP) ................... 2016-224648

(51) Int. Cl.
*F16J 15/54* (2006.01)
*F16J 15/3252* (2016.01)
*F16C 3/14* (2006.01)
*F16J 15/3268* (2016.01)
*F16H 55/36* (2006.01)

(52) U.S. Cl.
CPC ............. *F16J 15/3252* (2013.01); *F16C 3/14* (2013.01); *F16J 15/3268* (2013.01); *F16C 2226/12* (2013.01); *F16H 55/36* (2013.01)

(58) Field of Classification Search
CPC ...... F16J 15/3252; F16J 15/3268; F16C 3/14; F16C 2226/12; F16F 15/165; F16H 55/36
See application file for complete search history.

(56) References Cited

U.S. PATENT DOCUMENTS

| 4,337,954 | A | * | 7/1982 | Backlin | F16J 15/3232 277/565 |
| 5,152,538 | A | * | 10/1992 | Mims | F16J 15/3232 123/198 E |
| 9,388,765 | B2 | | 7/2016 | Kurita et al. | |
| 2008/0163842 | A1 | * | 7/2008 | Forssell | F02N 15/022 123/179.25 |
| 2017/0101960 | A1 | | 4/2017 | Goto | |
| 2017/0234398 | A1 | * | 8/2017 | Kamiya | F16F 15/126 277/562 |

FOREIGN PATENT DOCUMENTS

| JP | 2010-032021 A | 2/2010 |
| JP | 2015-140729 A | 8/2015 |
| JP | 2017-072084 A | 4/2017 |

* cited by examiner

*Primary Examiner* — Gilbert Y Lee
(74) *Attorney, Agent, or Firm* — Buchanan Ingersoll & Rooney PC

(57) ABSTRACT

An internal combustion engine includes an oil seal mounted at a crankshaft of an internal combustion engine body to restrain leakage of oil to an outside of the internal combustion engine, an oil seal fixing member fixed to the internal combustion engine body to fix the oil seal to the internal combustion engine body, and a cover member assembled on a lateral surface portion of the internal combustion engine body in a direction in which the crankshaft extends, the cover member covering the oil seal fixing member from a side opposite to the internal combustion engine body, the oil seal fixing member being fixed to the internal combustion engine body at a fixing position which is provided at an inner side than an outer edge portion of the cover member fastened to the internal combustion engine body.

11 Claims, 7 Drawing Sheets

INTERNAL COMBUSTION ENGINE

CROSS REFERENCE TO RELATED APPLICATIONS

This application is based on and claims priority under 35 U.S.C. § 119 to Japanese Patent Application 2016-224648, filed on Nov. 18, 2016, the entire content of which is incorporated herein by reference.

TECHNICAL FIELD

This disclosure generally relates to an internal combustion engine.

BACKGROUND DISCUSSION

An oil seal structure for an internal combustion engine is known to include an oil seal fixing member which fixes an oil seal. Such oil seal structure is disclosed, for example, in JP2010-32021A which is hereinafter referred to as Reference 1.

The oil seal structure disclosed in Reference 1 includes a timing chain cover (cover member) made of resin, an oil seal and a metallic retainer. The timing chain cover is arranged at a lateral surface portion of a cylinder block (internal combustion engine body). The oil seal is press-fitted to a crankshaft which penetrates through the timing chain cover. The metallic retainer fixes the oil seal. In the aforementioned oil seal structure, the metallic retainer includes a flange portion provided around a bore portion into which the crankshaft is inserted to be positioned and a pair of mounting members (left and right mounting members) integrally provided at the flange portion. The pair of mounting members extends from left and right edge portions of the flange portion to left and right outer edge portions of the timing chain cover respectively as viewed in a direction where the crankshaft extends. The pair of mounting members is fastened together with the timing chain cover to the cylinder block at the left and right outer edge portions of the timing chain cover.

According to the oil seal structure disclosed in Reference 1, because the pair of mounting members extends to the left and right outer edge portions of the timing chain cover, the metallic retainer is enlarged. In addition, because the pair of mounting members of the metallic retainer is fastened to the cylinder block at the left and right outer edge portions of the cover member, a fixing position at which the left mounting portion is fixed to the cylinder block and a fixing position at which the right mounting portion is fixed to the cylinder block are greatly separated from each other. Thus, a positional displacement between the aforementioned fixing positions may increase.

A need thus exists for an internal combustion engine which is not susceptible to the drawback mentioned above.

SUMMARY

According to an aspect of this disclosure, an internal combustion engine includes an oil seal mounted at a crankshaft of an internal combustion engine body to restrain leakage of oil to an outside of the internal combustion engine, an oil seal fixing member fixed to the internal combustion engine body to fix the oil seal to the internal combustion engine body, and a cover member assembled on a lateral surface portion of the internal combustion engine body in a direction in which the crankshaft extends, the cover member covering the oil seal fixing member from a side opposite to the internal combustion engine body, the oil seal fixing member being fixed to the internal combustion engine body at a fixing position which is provided at an inner side than an outer edge portion of the cover member fastened to the internal combustion engine body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments are explained with reference to the attached drawings.

An engine 100 according to a first embodiment is explained with reference to FIGS. 1 to 6. In the following explanation, a direction in which a crankshaft 12 extends at the engine 100 is defined as an X-axis direction. A direction perpendicular to the extending direction of the crankshaft 12 within a horizontal plane is defined as a Y-axis direction. A direction in which a cylinder 2a extends is defined as a Z-axis direction.

Figure 1:
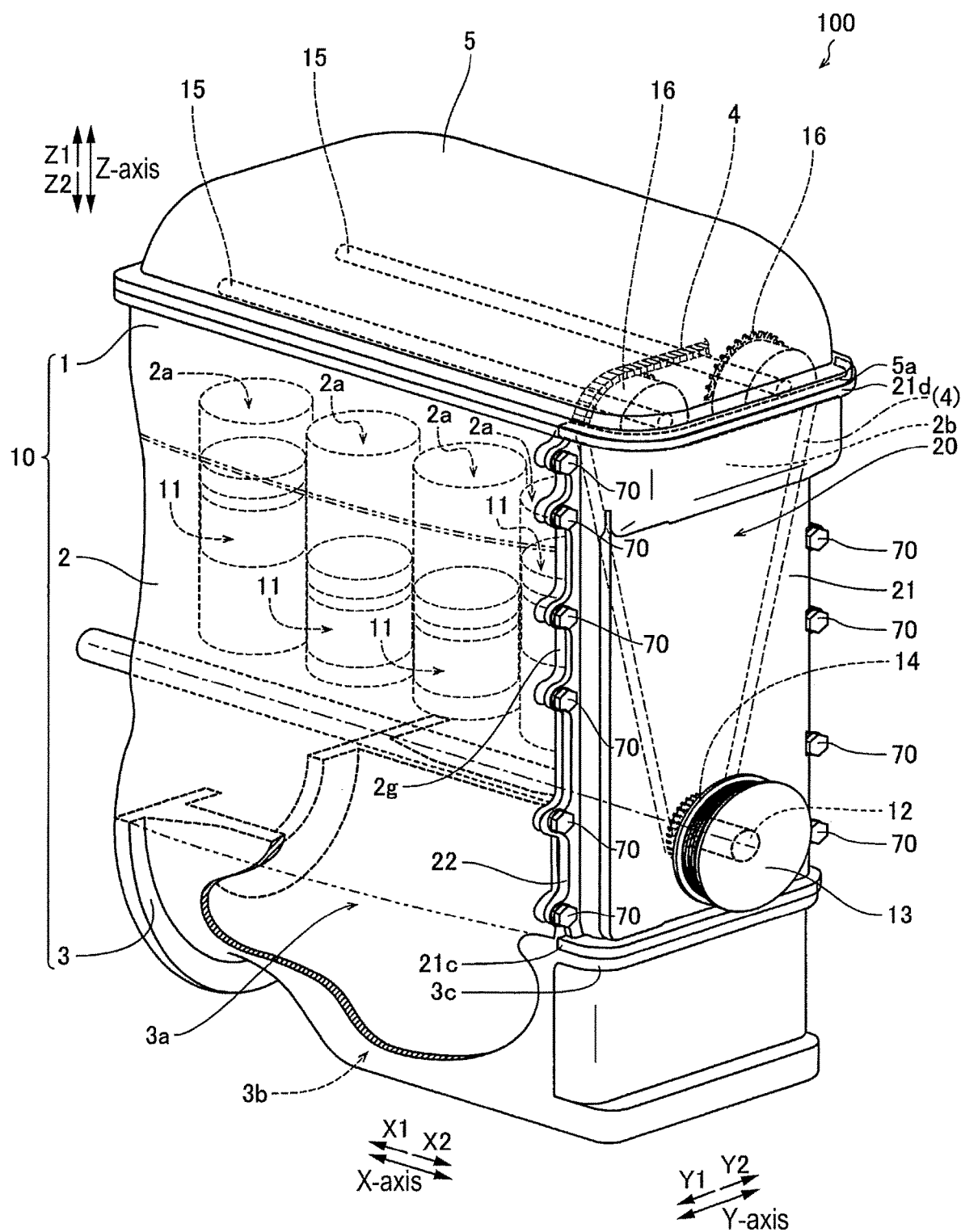
FIG. 1 is a perspective view illustrating a schematic construction of an engine according to a first embodiment disclosed here.

As illustrated in FIG. 1, the engine 100 serving as an example of an internal combustion engine for a vehicle includes an engine body 10 serving as an example of an internal combustion engine body. The engine body 10 includes a cylinder head 1, a cylinder block 2 and a crankcase 3. The cylinder head 1, the cylinder block 2 and the crankcase 3 constituting the engine body 10 are all made of aluminum alloy. The engine 100 also includes a timing chain cover 20 (which is hereinafter referred to as a TCC 20) assembled on a lateral surface portion 2b of the engine body 10 positioned at an X2 side and a head cover 5 assembled on an upper side (i.e., a Z1 side) of the cylinder head 1. The TCC 20 serves as an example of a cover member. The TCC 20, which is made of resin, is configured to cover a timing chain 4 serving as an example of a timing member.

Figure 2:
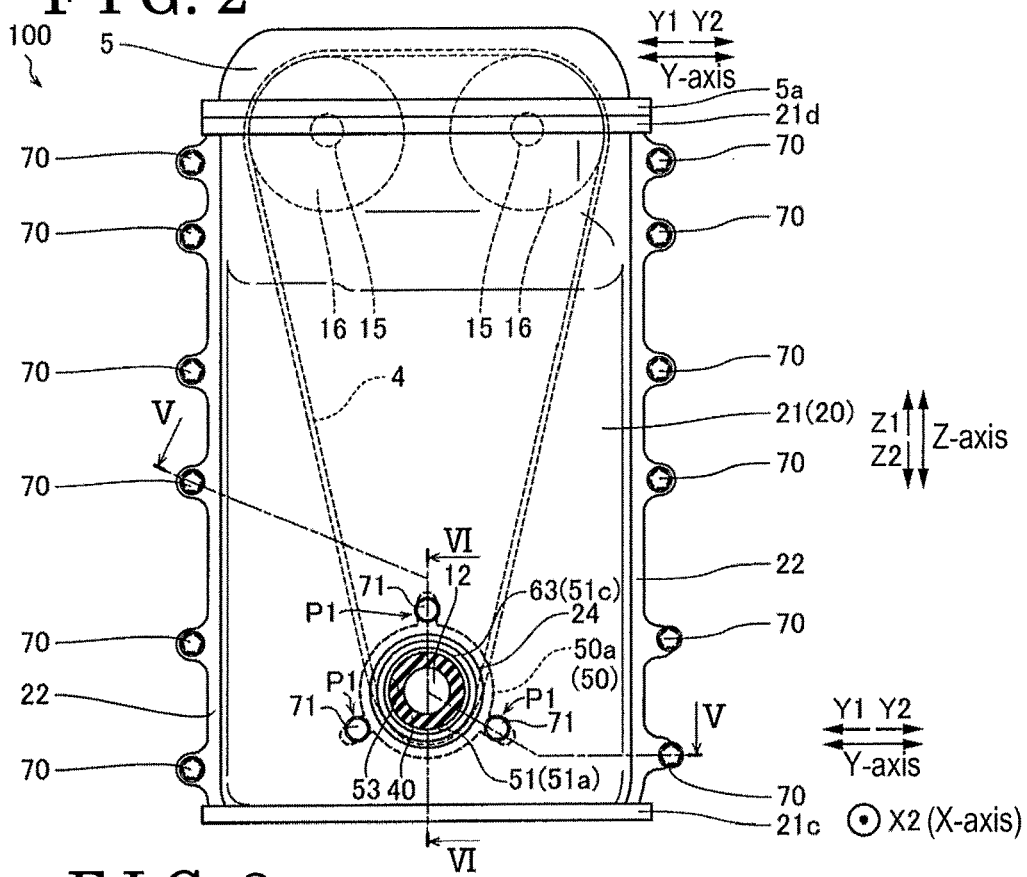
FIG. 2 is a side view illustrating a side portion of an engine on which a timing chain cover is assembled according to the first embodiment.

As illustrated in FIG. 2, the engine 100 further includes an annular oil seal 40 which restrains leakage of oil (so-called engine oil) to the outside of the engine 100 and an oil seal retainer 50 (which is hereinafter referred to as a retainer 50) which fixes the oil seal 40 and which is made of aluminum alloy. The retainer 50 serves as an example of an oil seal fixing member. The retainer 50 is assembled on the lateral surface portion 2b of the engine body 10 at the X2 side and is covered by the TCC 20 from the X2 side (i.e., an opposite side to the engine body 10).

As illustrated in FIG. 1, camshafts 15 and a valve mechanism constituting a valve train system timing member, for example, are arranged at an inner portion of the cylinder head 1. Cylinders 2a within which pistons 11 reciprocate in the Z-axis direction are provided at an inner portion of the cylinder block 2 which is connected to a lower side (i.e., a Z2 side) of the cylinder head 1. An intake apparatus which introduces intake air to the plural (specifically, four in the present embodiment) cylinders 2a provided at the cylinder block 2 is connected to the cylinder head The cylinder block 2 and the crankcase 3 connected to the lower side (the Z2 side) of the cylinder block 2 form a crank chamber 3a provided at an inner bottom portion of the engine body 10. The crankshaft 12 is arranged at the crank chamber 3a so as to be rotatably connected thereto via the pistons 11 and con rods. In FIG. 1, the crankshaft 12 is illustrated as including a substantially bar-form. The crankshaft 12 is actually constructed in a way that a crankpin including an eccentric rotation axis and disposed immediately below each of the cylinders 2a and a balance weight which holds and pinches the crankpin are connected to a crank journal.

The oil seal 40 (see FIG. 2) is fixed to the crankshaft 12 at the X2 side. A damper pulley 13 for driving an auxiliary machinery such as an alternator, for example, is fixed to an end portion (front end) of the crankshaft 12 at the X2 side. The damper pulley 13 includes a function to transmit a rotation drive force of the crankshaft 12 to the auxiliary machinery while decreasing a torsional vibration of the crankshaft 12. The damper pulley 13 is provided at an outer side (i.e., the X2 side) of the TCC 20. That is, the damper pulley 13 is disposed at the outside of the engine 100.

A chain sprocket 14 with which the timing chain 4 engages and meshes is fitted to the crankshaft 12. The chain sprocket 14 serves as an example of a timing member engagement portion. The chain sprocket 14 is disposed at an inner side (an X1 side) of the engine 100 (the TCC 20). The chain sprocket 14 and camshaft timing sprockets 16 which are mounted at the inner portion of the cylinder head 1 for driving the camshafts 15 are connected to one another via the timing chain 4 at an inner portion of the TCC 20. Accordingly, the rotation drive force is transmitted from the crankshaft 12 to the camshafts 15 via the timing chain 4.

An oil storage portion 3b which stores engine oil (which is hereafter simply referred to as oil) is provided at a lower portion (at the Z2 side) of the crank chamber 3a. The oil is pumped by an oil pump from the oil storage portion 3b to an upper portion within the engine body 10 so as to be supplied to the valve train system timing member including the camshafts 15 and a sliding portion such as an outer peripheral surface of each of the pistons 11, for example. The oil thereafter drops by its own weight to return to the oil storage portion 3b.

Figure 3:
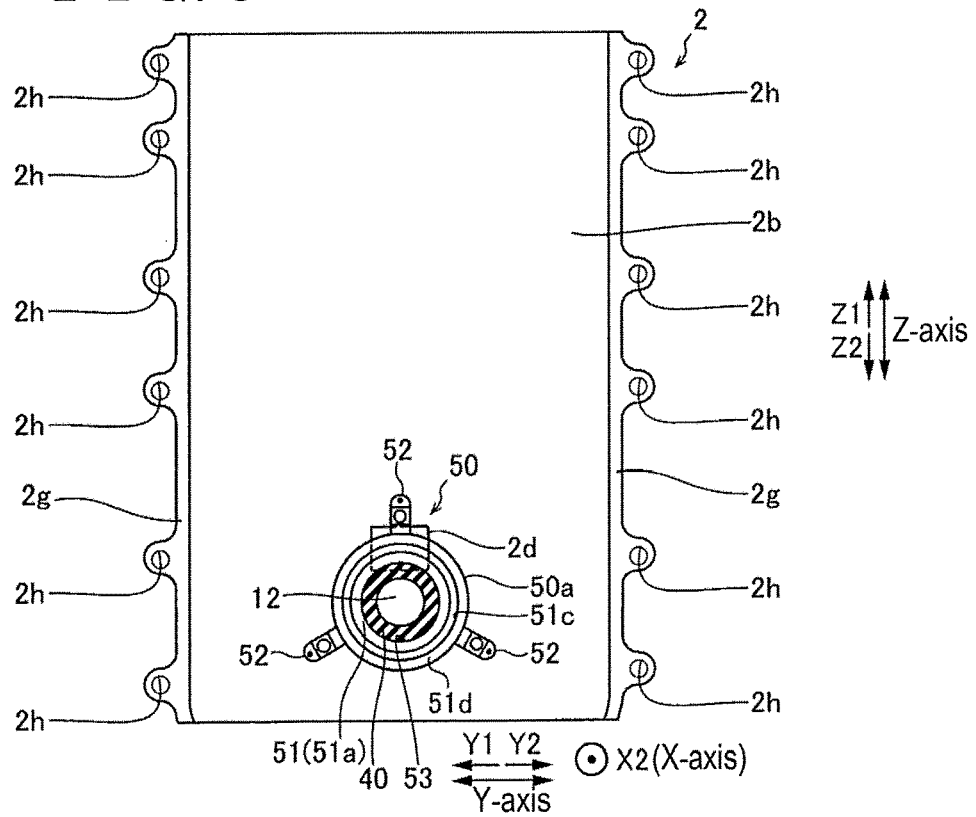
FIG. 3 is a side view illustrating an engine body and a retainer at the engine in a state where the timing chain cover is removed according to the first embodiment.

As illustrated in FIG. 3, an insertion bore 2c (see FIG. 5) into which the crankshaft 12 is inserted to be positioned and a release bore 2d through which blow-by gas within the crank chamber 3a is released to between the TCC 20 and the engine body 10 are provided at the lateral surface portion 2b serving as an example of a lateral surface portion of the internal combustion engine body. In addition, three screw holes 2e (see FIG. 5) for fixing the retainer 50 and the TCC 20 and positioning holes 2f (see FIG. 5) which are provided in the vicinity of the respective screw holes 2e and to which knock pins 61 are fitted are provided at the lateral surface portion 2b. Each of the positioning holes 2f is in a circular form conforming to each of the knock pins 61 in a column form.

Flange portions 2g are provided at opposed edge portions of the lateral surface portion 2b in the Y-axis direction. Plural screw holes 2h are provided at each of the flange portions 2g so as to fix the TCC 20 to the engine body 10.

Figure 4:
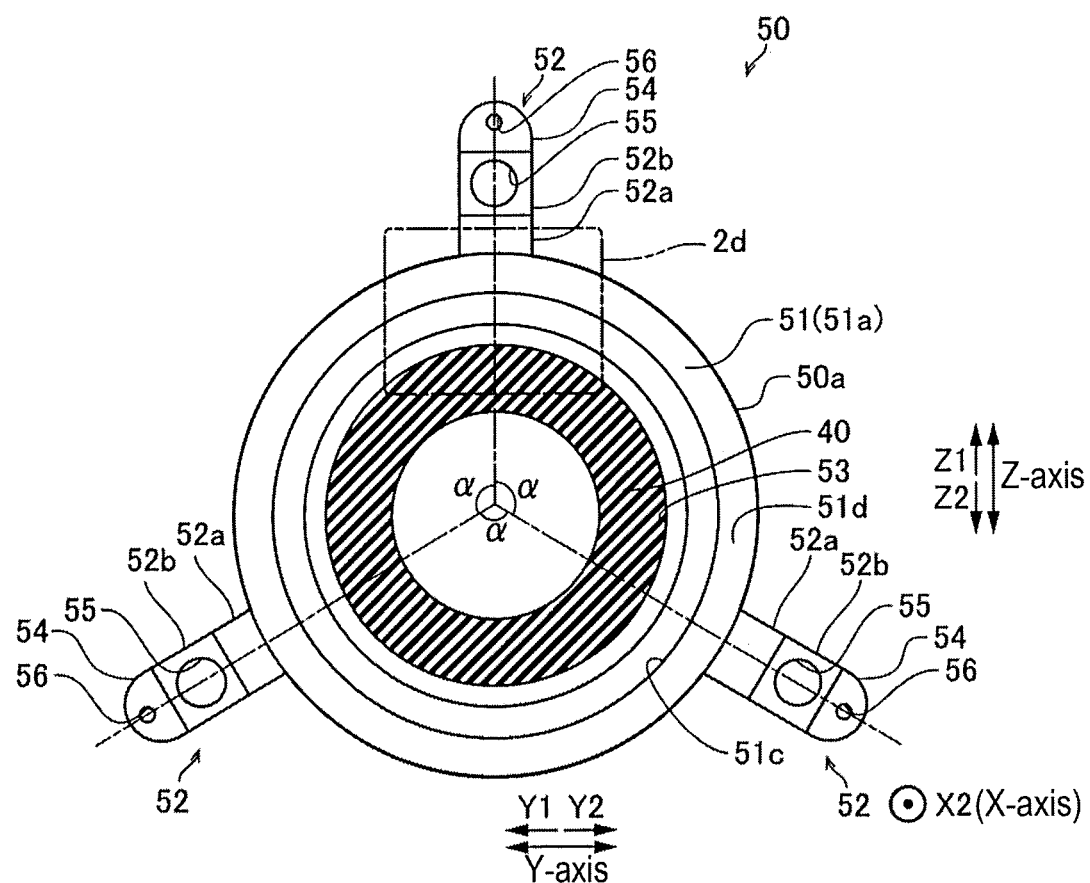
FIG. 4 is an enlarged view illustrating the retainer at the engine according to the first embodiment.
Figure 5:
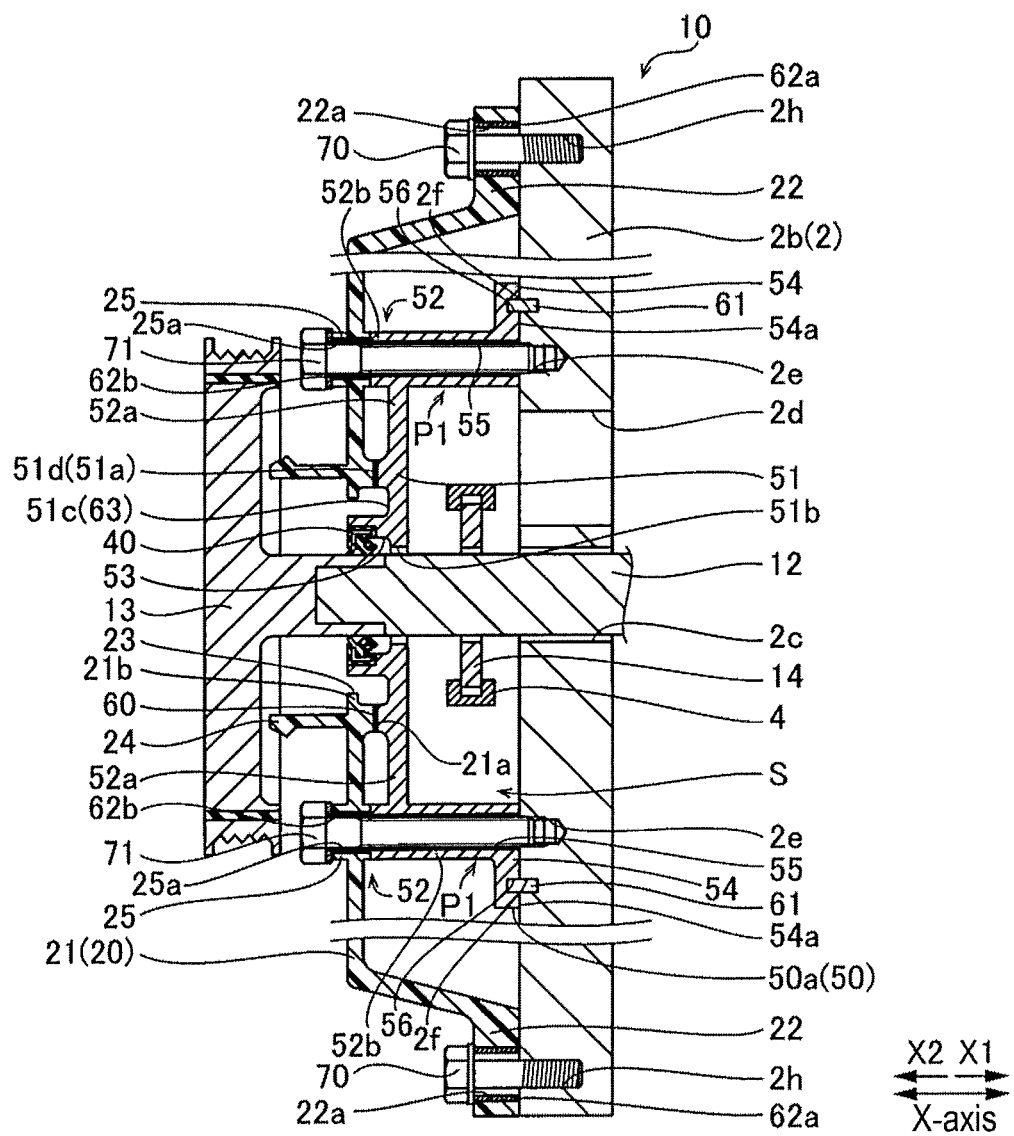
FIG. 5 is a cross-sectional view taken along a line V-V in FIG. 2.
Figure 6:
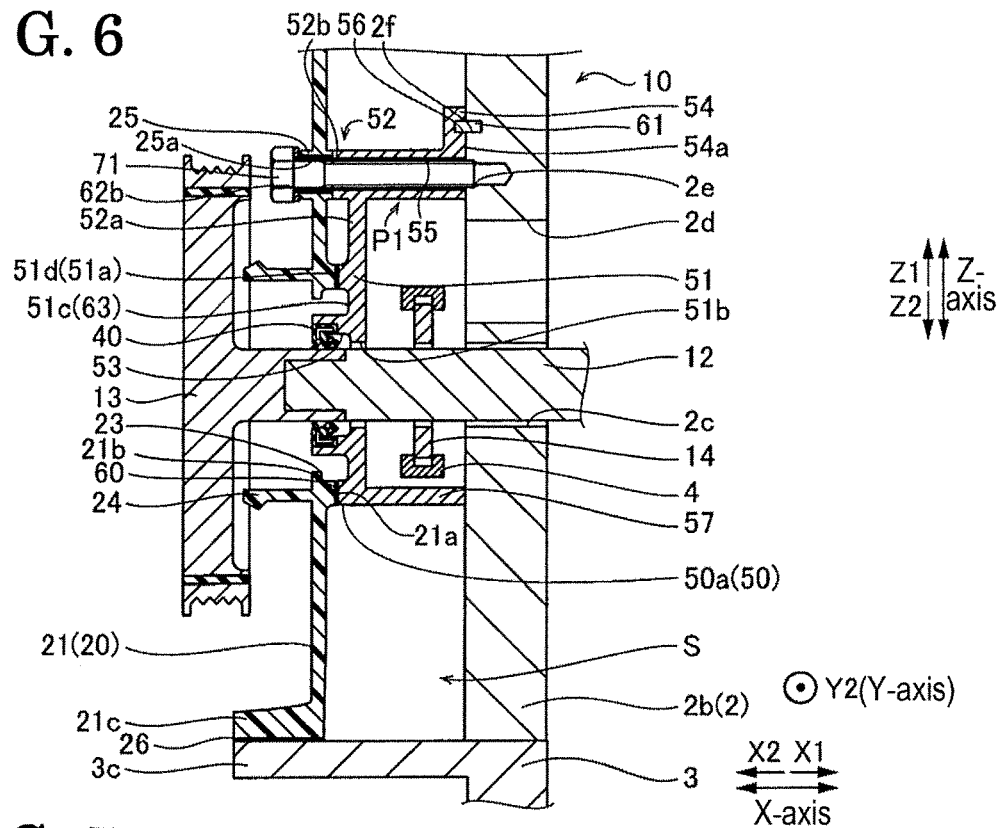
FIG. 6 is a cross-sectional view taken along a line VI-VI in FIG. 2.

Next, a construction of the retainer 50 is explained. As illustrated in FIGS. 4 to 6, the retainer 50 includes a body portion 51 and three fixing portions 52. The body portion 51 is arranged away from the engine body 10 in the X2 direction. The fixing portions 52 are connected to an outer edge portion of the body portion 51 to protrude in the X1 direction. A void S is defined between the engine body 10 and the body portion 51 of the retainer 50.

The body portion 51 is formed in a circular form as viewed from a lateral side in the X2 direction (i.e., a lateral side in a direction in which the crankshaft 12 extends). An oil seal fixing portion 53 is provided at a substantially center of the body portion 51. The oil seal fixing portion 53 is formed in a recess form dented in the X1 direction from a front surface 51a of the body portion 51 provided at the X2 side. The oil seal 40 in an annular form is press-fitted to the oil seal fixing portion 53 from the X2 direction so that the oil seal 40 is fixed to the retainer 50.

An insertion bore 51b is provided at a center portion of the oil seal fixing portion 53. The engine 100 is constructed so that the damper pulley 13 arranged at the outside of the engine 100 and the crankshaft 12 are connectable to each other because of the crankshaft 12 penetrating through the insertion bore 51b.

The body portion 51 includes a circumferential groove portion 51c surrounding the oil seal fixing portion 53. The circumferential groove portion 51c is circumferentially arranged at a position apart from the oil seal fixing portion 53 by a predetermined distance. The front surface 51a in a circumferential form at a radially outer side of the circumferential groove portion 51c is constituted as a seal surface 51d at which a seal portion 60 is arranged. The seal portion 60 is obtained by solidification of liquid seal material (liquid gasket) so as to include improved air-tightness.

The body portion 51 is arranged to cover at least a portion of the release bore 2d of the cylinder block 2 as viewed from the lateral side in the X2 direction. The body portion 51 is also arranged to fully cover the chain sprocket 14 which is assembled on the crankshaft 12 as viewed from the lateral side in the X2 direction.

The three fixing portions 52 include substantially the same configurations as one another. Each of the fixing portions 52 includes a connection portion 52a protruding from the outer edge portion of the body portion 51, a leg portion 52b protruding in the X1 direction from the connection portion 52a and a contact portion 54 making contact with the lateral surface portion 2b of the engine body 10. The connection portion 52a is configured to be dented in the X1 direction relative to the front surface 51a of the body portion 51.

Each of the fixing portions 52 includes a bolt insertion bore 55 into which a bolt 71 is inserted to be positioned and a positioning hole 56 to which the knock pin 61 is fitted. The bolt insertion bore 55 serves as an example of a fixing member fastening portion and the positioning hole 56 serves as an example of a positioning portion. The bolt insertion bore 55 extends through the entire leg portion 52b in the X-axis direction to be connected to the screw hole 2e of the cylinder block 2.

The positioning hole 56 is provided away from the body portion 51 further than the bolt insertion bore 55 and is positioned in the vicinity of (i.e., adjacent to) the bolt insertion bore 55. The positioning hole 56 is a circular bottomed hole as viewed from the X1 direction and is connected to the positioning hole 2f of the cylinder block 2. Accordingly, the engine 100 is constructed so that the retainer 50 is positioned relative to the engine body 10 by the knock pins 61 fitted to the respective positioning holes 56 in a state where the knock pins 61 each of which is in a column form are fitted to the respective positioning holes 2f.

The three fixing portions 52 are arranged at substantially equal angular intervals (specifically, an interval of angle α) as viewed from the lateral side in the X2 direction. The fixing portions 52 are provided at the Z1 side, at the Z2 side and a Y1 side (i.e., at a side between the Z2 side and the Y1 side), and at the Z2 side and a Y2 side (i.e., at a side between the Z2 side and the Y2 side) respectively in the body portion 51.

The retainer 50 is constructed so that each of the fixing portions 52 and the timing chain 14 are inhibited from interfering with each other at a portion between the fixing portion 52 at the Z1 side and the fixing portion 52 at the Z2 side and the Y1 side, and at a portion between the fixing portion 52 at the Z2 side and the Y1 side and the fixing portion 52 at the Z2 side and the Y2 side.

As illustrated in FIG. 6, a leg portion 57 is provided between the two fixing portions 52 at the Z2 side so as to protrude in the X1 direction from the body portion 51. An end portion of the leg portion 57 in the X1 direction is configured to make contact with the lateral surface portion 2b of the engine body 10. Accordingly, the oil is stored only at the void S defined between the retainer 50 and the engine body 10 at a lower portion of the engine body 10. The oil is inhibited from being stored at a portion where the retainer 50 is not arranged, between the TCC 20 and the engine body 10. The TCC 20 made of resin positioned at the portion where the retainer 50 is not arranged is restrained from being deteriorated by the oil, for example. Therefore, sealing ability at a portion between a flange portion 21c at a lower end of a body portion 21 of the TCC 20 and a flange portion 3c of the crankcase 3 (see FIG. 6) which are explained later may be restrained from being deteriorated.

In addition, the retainer 50 is configured to surround the chain sprocket 14 by the body portion 51, the fixing portions 52 and the leg portion 57.

Next, a construction of the TCC 20 is explained. As illustrated in FIG. 2, the TCC 20 includes the body portion 21 which protrudes in the X2 direction and a pair of flange portions 22 provided at opposed end portions of the body portion 21 in the Y-axis direction. The pair of flange portions 22 is provided corresponding to the respective flange portions 2g provided at the lateral surface portion 2b of the cylinder block 2.

Plural bolt insertion bores 22a each of which serves as an example of a cover member fastening portion are provided at each of the flange portions 22 so as to fix the TCC 20 to the engine body 10 as illustrated in FIG. 5. The bolt insertion bores 22a are provided corresponding to the screw holes 2h provided at the cylinder block 2 (see FIG. 3). As illustrated in FIG. 5, a collar 62a made of metal and formed in a cylindrical form is inserted to be positioned within each of the bolt insertion bores 22a. Bolts 70 are fastened to the respective screw holes 2h of the cylinder block 2 in a state being inserted to be positioned within the respective bolt insertion bores 22a of the TCC 20 at an outer edge portion (i.e., the flange portions 22) of the TCC 20 at the engine 100. The TCC 20 is thus fixed and fastened to the engine body 10.

As illustrated in FIG. 2, the TCC 20 is arranged overlapping the lateral surface portion 2b of the engine body 10 (see FIG. 1) in the X2 direction as viewed from the lateral side in the X2 direction. In addition, as illustrated in FIGS. 2 and 5, the TCC 20 is assembled on the lateral surface portion 2b of the engine body 10 (the cylinder block 2) so as to entirely cover the retainer 50 from the X2 direction (i.e., in a direction opposite to the engine body 10). That is, as viewed from the lateral side in the X2 direction, an outer edge portion 50a serving as an outermost edge portion of the body portion 51 and the fixing portions 52 of the retainer 50 is entirely positioned at an inner side (i.e., at a side closer to the crankshaft 12) than the outer edge portion (i.e., the flange portions 22, 21c and a flange portion 21d) of the TCC 20.

As illustrated in FIG. 5, a penetration bore 23 is provided at a lower side (the Z2 side) of the body portion 21 so as to be positioned in the vicinity of a center portion in the Y-axis direction. The penetration bore 23 includes a circular form with a larger diameter than the oil seal fixing portion 53 of the retainer 50 as viewed from the lateral side in the X2 direction.

As illustrated in FIGS. 2 and 5, the body portion 21 includes a circumferential wall portion 24 serving as an example of a restriction portion so as to surround the penetration bore 23. The circumferential wall portion 24 protrudes in the X2 direction from the body portion 21. An end portion of the circumferential wall portion 24 in the X2 direction is formed in a hook form. The circumferential wall portion 24 is obtained together with the other component portions of the TCC 20 when the TCC 20 is formed by resin molding. That is, the circumferential wall portion 24 is integrally formed at the TCC 20. The circumferential wall portion 24 functions to restrict a foreign substance from the outside of the engine from entering the retainer 50 provided at the inside of the TCC 20. The circumferential wall portion 24 is constructed so that the end portion of the hook form is disposed within a recess portion of the damper pulley 13, the recess portion being provided at the X1 direction in the damper pulley 13. A labyrinth structure is thus provided by the damper pulley 13 and the circumferential wall portion 24. The foreign substance from the outside is inhibited from entering the retainer 50 at the inside of the TCC 20 accordingly.

The body portion 21 includes three boss portions 25 (see FIG. 5) provided at an outer side than the circumferential wall portion 24. The three boss portions 25 are provided corresponding to the leg portions 52b of the three fixing portions 52 of the retainer 50. A bolt insertion bore 25a is provided at each of the boss portions 25 so as to penetrate through the body portion 21 in the X-axis direction. The bolt insertion bore 25a is connected to the bolt insertion bore 55 of the retainer 50. A collar 62b made of metal and formed in a cylindrical form is inserted to be positioned within the bolt insertion bore 25a.

Accordingly, the retainer 50 is fixed and tightened, together with the TCC 20, to the engine body 10 by the bolts 71 being fastened to the screw holes 2e of the cylinder block 2 in a state where the bolts 71 are inserted to be positioned within the bolt insertion bores 25a of the TCC 20 and the bolt insertion bores 55 of the retainer 50 at three fastening positions P1 each of which serves as an example of a fixing position, at the engine 100.

In the first embodiment, the three fastening positions P1 are provided at the inner side than the outer edge portion (the flange portions 22) of the TCC 20. In addition, the three fastening positions P1 are provided closer to the crankshaft 12 than the outer edge portion (the flange portions 22) of the TCC 20. The positioning holes 56 of the retainer 50 provided in the vicinity of the three fastening positions P1 are also provided at the inner side than the outer edge portion (the flange portions 22) of the TCC 20 and closer to the crankshaft 12 than the outer edge portion (the flange portions 22) of the TCC 20. The three fastening positions P1 are arranged at substantially equal intervals of angle α (which is approximately 120 degrees) around the chain sprocket 14 as viewed from the lateral side in the X2 direction.

As illustrated in FIG. 5, the seal surface 51d of the retainer 50 is positioned, via the seal portion 60, at a surface (specifically, a seal surface 21a) of the body portion 21 in the X2 direction where the circumferential wall portion 24 of the body portion 21 is provided. Because of the seal portion 60, the foreign substance is restrained from entering the inner portion of the TCC 20 through a possible gap between the TCC 20 and the retainer 50. The seal surface 21a is provided in the vicinity of the penetration bore 23.

The body portion 21 includes a circumferential protruding portion 21b protruding to the inner side of the penetration bore 23 (to the crankshaft 12). The circumferential protruding portion 21b is provided to cover a portion of the circumferential groove portion 51c of the retainer 50 from the X2 direction. As a result, a circumferential storage portion 63 serving as an example of a seal material restriction portion is provided by the circumferential protruding portion 21b and the circumferential groove portion 51c.

As illustrated in FIGS. 1 and 2, the body portion 21 includes the flange portion 21c at a lower end. The flange portion 21c is provided corresponding to the flange portion 3c of the crankcase 3. In the same manner, the body portion 21 includes the flange portion 21d at an upper end. The flange portions 21c and 21d make contact with the flange portion 3c and a flange portion 5a respectively via a seal member 26 (see FIG. 6).

According to the first embodiment, as mentioned above, the fixing positions (the fastening positions P1) of the retainer 50 relative to the engine body 10 are provided at the inner side than the outer edge portion (the flange portions 22) of the TCC 20 which is fastened to the engine body 10. Therefore, the retainer 50 is not necessary to extend to the outer edge portion of the TCC 20, which restrains the retainer 50 from being enlarged. The engine 100 may be light-weighted accordingly. In addition, in a case where the retainer 50 is fixed to the engine body 10 via the plural positions (three positions), the fastening positions P1 of the retainer 50 relative to the engine body 10 are provided at the inner side than the outer edge portion of the TCC 20 which is fastened to the engine body 10. Accordingly, the plural fastening positions P1 are restrained from being greatly away from one another. Because a positional displacement based on an angular displacement from one of the fastening positions P1 to the other of the fastening positions P1 is restrained from increasing, the positional displacement generated among the fastening positions P1 is restrained from increasing. Accordingly, while the retainer 50 is restrained from being enlarged, the displacement amount generated among the fastening positions P1 is restrained from increasing.

In the first embodiment, the outer edge portion 50a of the retainer 50 is positioned at the inner side than the outer edge portion (the flange portions 22, 21c and 21d) of the TCC 20 as viewed from the lateral side in the X-axis direction in which the crankshaft 12 extends. Thus, the retainer 50 may be further downsized to thereby obtain the engine 100 with a reduced weight.

In the first embodiment, the TCC 20 is fastened to the engine body 10 at the bolt insertion bores 22a provided at the flange portions 22. The retainer 50 is fastened and fixed to the engine body 10 at the bolt insertion bores 55 of the fixing portions 52 which are provided closer to the crankshaft 12 than the bolt insertion bores 22a of the flange portions 22. Because the retainer 50 is fastened to the engine body 10 at the bolt insertion bores 55 of the fixing portions 52 provided closer to the crankshaft 12 than the bolt insertion bores 22a of the flange portions 22, the retainer 50 may be fastened to the engine body 10 around the crankshaft 12. As a result, the retainer 50 for fixing the oil seal 40 mounted at the crankshaft 12 may be further downsized in a state where the retainer 50 is simply provided in the vicinity of the crankshaft 12.

In the first embodiment, the retainer 50 is fastened to the engine body 10 together with the TCC 20 at the bolt insertion bores 55 of the fixing portions 52. While the retainer 50 is fixed to the engine body 10, the TCC 20 and the retainer 50 are fixed to each other. As a result, a relative position of the retainer 50 relative to the TCC 20 may be effectively restrained from moving.

In the first embodiment, the retainer 50 includes the positioning holes 56 provided in the vicinity of the respective bolt insertion bores 55 of the fixing portions 52 so as to position the retainer 50 relative to the engine body 10. The positioning of the retainer 50 relative to the engine body 10 may be easily performed by the positioning holes 56 provided in the vicinity of the bolt insertion bores 55. Because the positioning holes 56 are positioned in the vicinity of the respective three bolt insertion bores 55 provided around the crankshaft 12, the positioning holes 56 at the three positions may be closely arranged to one another. As a result, a distance between the adjacent knock pins 61 is reduced, which may further restrain the increase of the positional displacement based on the angular displacement from one of the fastening positions P1 to the other of the fastening positions P1.

In the first embodiment, the retainer 50 is provided surrounding the chain sprocket 14 as viewed from the lateral side. Thus, the chain sprocket 14 is arranged at the void S defined between the retainer 50 and the engine body 10. While the oil which is dispersed from the chain sprocket 14 is restrained from being adhered to the TCC 20, the void S is effectively utilized.

In the first embodiment, the fixing positions of the retainer 50 relative to the engine body 10 (i.e., the fastening positions P1) are arranged at the substantially equal intervals of the angle α (which is approximately 120 degrees) around the chain sprocket 14 as viewed from the lateral side in the X2 direction. Thus, the retainer 50 may be stably fastened and fixed to the engine body 10.

In the first embodiment, the three fastening positions P1 are provided at predetermined angular intervals, i.e., the interval of the angle α. Thus, as compared to a case where the two fastening positions P1 are provided, the retainer 50 may be further stably fastened and fixed to the engine body 10.

In the first embodiment, the retainer 50 is made of aluminum alloy (i.e., made of metal) while the TCC 20 is made of resin. Because the blow-by gas at high temperature is restrained from blowing directly to the TCC 20 made of resin which is easily deformable by heat as compared to metal, the TCC 20 made of resin is restrained from being deformed.

In the first embodiment, the TCC 20 made of resin integrally includes the circumferential wall portion 24 which restricts the foreign substance from entering the retainer 50. The circumferential wall portion 24 which restricts the foreign substance from entering the retainer 50 may be easily obtained when the TCC 20 is formed by resin molding. In addition, because the circumferential wall portion 24 is formed circumferentially, the foreign substance may be further securely restrained from entering the retainer 50.

In the first embodiment, the storage portion 63 is provided at the engine 100 so as to restrain the liquid seal material from flowing to the outer surface side (at the X2 side) of the TCC 20. Accordingly, because of the storage portion 63, the seal portion 60 which is not yet solidified and leaks from between the seal surface 21a and the seal surface 51d is restrained from flowing to the outer surface side (at the X2 side) of the TCC 20 in a case where the seal portion 60 in liquid form is solidified.

In the first embodiment, the release bore 2d is provided at the lateral surface portion 2b of the engine body 10 so as to release the blow-by gas within the crank chamber 3a. Then, the body portion 51 is arranged covering at least a portion of the release bore 2d of the cylinder block 2 as viewed from the lateral side in the X2 direction. Accordingly, the blow-by gas which moves from the engine body 10 to the TCC 20 is restrained from blowing directly to the TCC 20 by the retainer 50 positioned closer to the engine body 10 (i.e., at the X1 side) than the TCC 20. As a result, the TCC 20 is restrained from being deformed, for example, by the blow-by gas.

Figure 7:
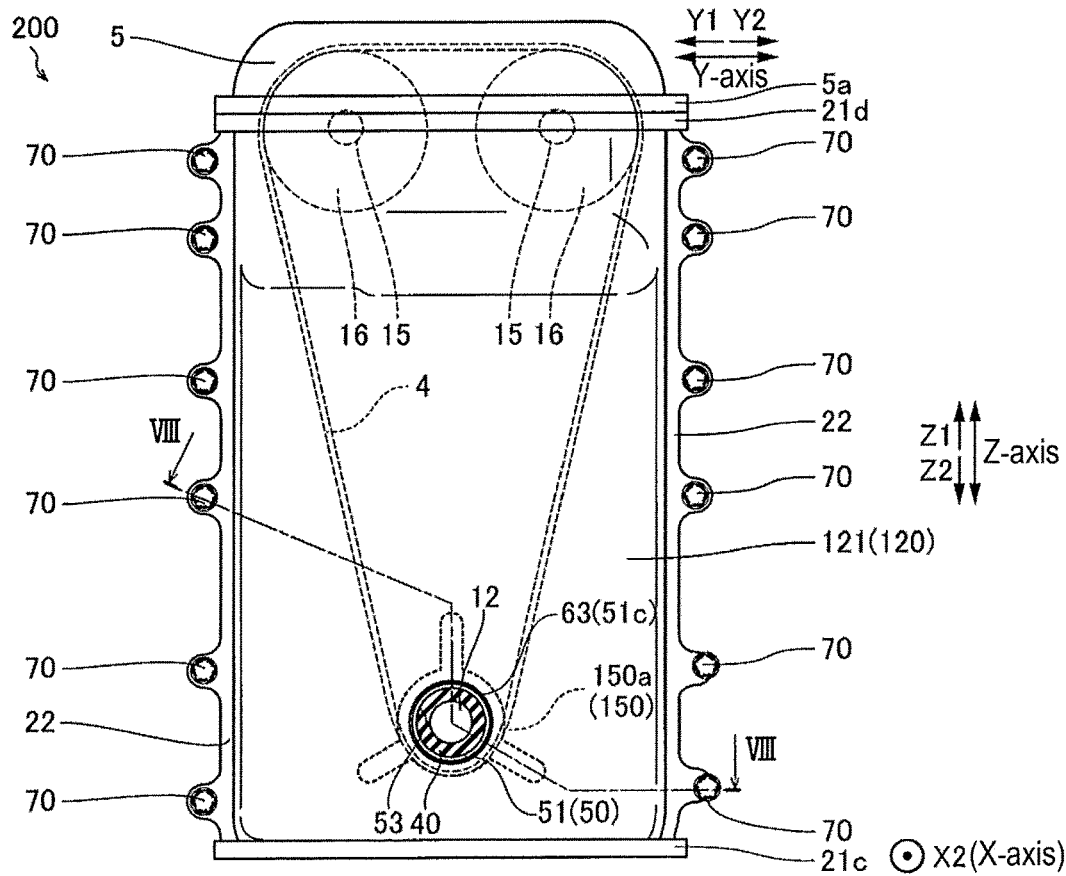
FIG. 7 is a side view illustrating a side portion of the engine on which the timing chain cover is assembled according to a second embodiment disclosed here.
Figure 8:
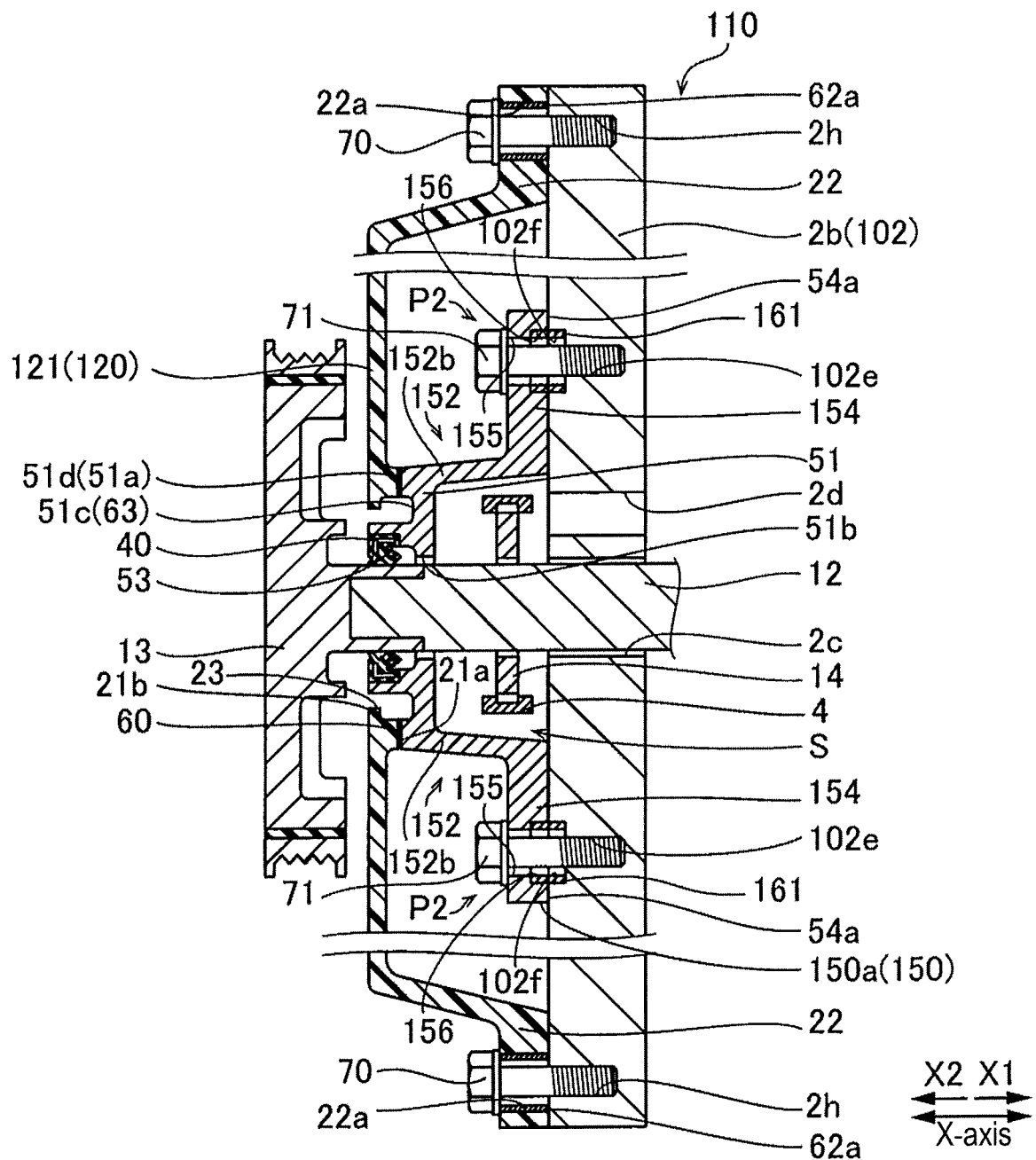
FIG. 8 is cross-sectional view taken along a line VIII-VIII in FIG. 7.
Figure 9:
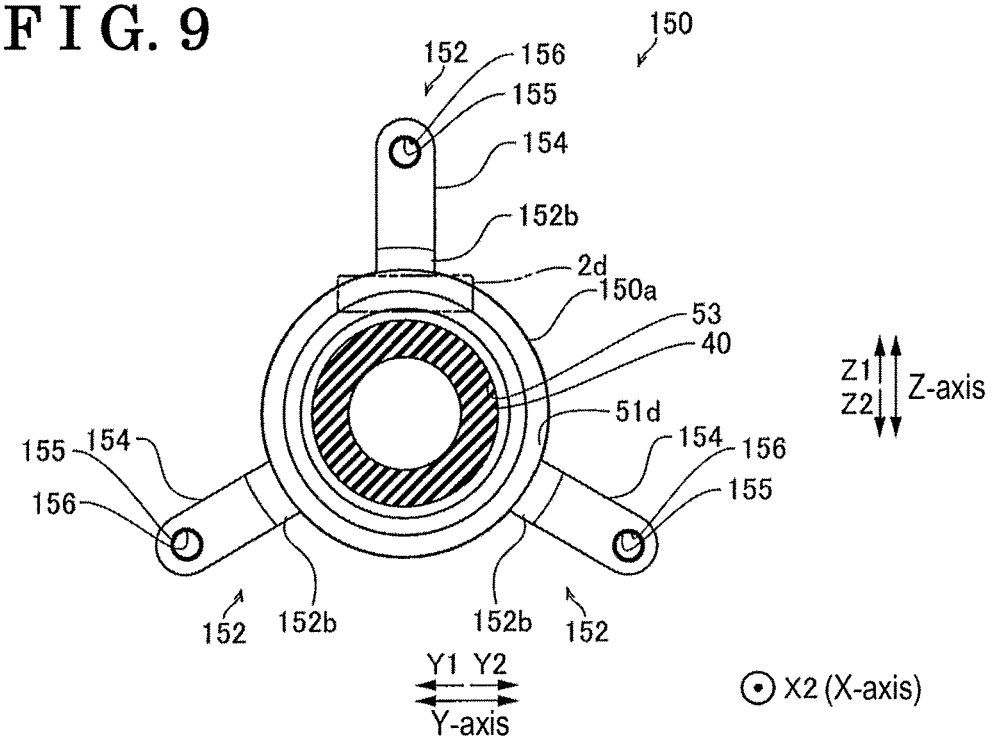
FIG. 9 is an enlarged view illustrating the retainer at the engine according to the second embodiment.

Next, a second embodiment is explained with reference to FIGS. 7 to 9. According to the second embodiment, being different from the first embodiment, a timing chain cover 120 (which is hereinafter referred to as a TCC 120) serving as an example of the cover member and a retainer 150 are separately fixed to an engine body 110. In FIGS. 7 to 9, the same constructions as the first embodiment bear the same reference numerals as the first embodiment and explanation is omitted.

As illustrated in FIGS. 7 and 8, an engine 200 serving as an example of the internal combustion engine includes the engine body 110 serving as an example of the internal combustion engine body. The engine body 110 includes a cylinder block 102 made of aluminum alloy. The engine 200 includes the TCC 120 made of resin and assembled on the lateral surface portion 2b of the engine body 110 at the X2 side so as to cover the timing chain 4.

As illustrated in FIG. 8, the engine 200 also includes the retainer 150 made of aluminum alloy for fixing the oil seal 40. The retainer 150 serves as an example of the oil seal fixing member. The retainer 150 is assembled on the lateral surface portion 2b of the engine body 110 at the X2 side and is covered by the TCC 120 from the X2 side (i.e., an opposite side to the engine body 110).

Three screw holes 102e for fixing the retainer 150 and positioning recess portions 102f provided around the respective screw holes 102e and receiving annular ring pines 161 in a fitting manner are provided at the lateral surface portion 2b of the cylinder block 102. Each of the positioning recess portions 102f is in a circular form as viewed in the X2 direction so as to correspond to each of the ring pins 161 in an annular form.

A construction of the retainer 150 is explained below. As illustrated in FIGS. 8 and 9, the retainer 150 includes three fixing portions 152 connected to the outer edge portion of the body portion 51 so as to protrude in the X1 direction. The three fixing portions 152 include substantially the same configurations as one another. Each of the fixing portions 152 includes a leg portion 152b protruding in the X1 direction from the outer edge portion of the body portion 51 and a contact portion 154 fixed to the engine body 110 in a state making contact with the cylinder block 102 of the engine body 110. In the second embodiment, the connection portion 52a which is provided in the first embodiment is not provided.

The fixing portion 152 includes a bolt insertion bore 155 serving as an example of the fixing member fastening portion into which the bolt is inserted to be positioned and a positioning recess portion 156 serving as an example of the positioning portion to which the ring pin 161 is fitted. The bolt insertion bore 155 extends through the entire leg portion 152b in the X-axis direction to be connected to the screw hole 102e of the cylinder block 102.

The positioning recess portion 156 is provided away from the body portion 51 further than the bolt insertion bore 155 and is positioned in the vicinity of (i.e., adjacent to) the bolt insertion bore 155 as illustrated in FIG. 8. The positioning recess portion 156 is formed in a circular form as viewed from the X1 direction and is provided at a position corresponding to the positioning recess portion 102f of the cylinder block 102. Accordingly, the engine 100 is constructed so that the retainer 150 is positioned relative to the engine body 110 by the annular ring pins 161 fitted to the respective positioning recess portions 156 in a state where the ring pins 161 are fitted to the respective positioning recess portions 102f.

The three fixing portions 152 are arranged at substantially equal angular intervals as viewed from the lateral side in the X2 direction.

As a result, in the engine 200, the retainer 150 is fixed and fastened to the engine body 110 by the bolts 71 being fastened to the respective screw holes 102e of the cylinder block 102 in a state where the bolts 71 are inserted to be positioned within the bolt insertion bores 155 of the retainer 150 at three fastening positions P2 each of which serves as an example of the fixing position.

In the second embodiment, the three fastening positions P2 are provided at an inner side than an outer edge portion (i.e., the flange portions 22) of the TCC 120. In addition, the three fastening positions P2 are provided closer to the crankshaft 12 than the outer edge portion (the flange portions 22) of the TCC 120. The positioning recess portions 156 of the retainer 150 provided around the three fastening positions P2 are also provided at the inner side than the outer edge portion (the flange portions 22) of the TCC 120 and closer to the crankshaft 12 than the outer edge portion (the flange portions 22) of the TCC 120, in the same way as the three fastening positions P2. The three fastening positions P2 are arranged at the substantially equal angular intervals around the chain sprocket 14 as viewed from the lateral side in the X2 direction.

A construction of the TCC 120 is explained below. As illustrated in FIGS. 7 and 8, the TCC 120 includes a body portion 121 protruding in the X2 direction. An outer edge portion 150a serving as an outermost edge portion of the body portion 51 and the fixing portions 152 of the retainer 150 is entirely positioned at the inner side than the outer edge portion (the flange portions 22, 21c and 21d) of the TCC 120.

In the second embodiment, the boss portions 25 including the respective bolt insertion bores 25a provided in the first embodiment are not provided at the TCC 120. As a result, the retainer 150 is not fastened together with the TCC 120 to the engine body 110. The retainer 150 and the TCC 120 are separately and individually fixed to the engine body 110. In addition, the circumferential wall portion 24 provided in the first embodiment is not provided at the TCC 120. The other construction of the second embodiment is substantially the same as the first embodiment.

According to the second embodiment, as mentioned above, the fixing positions (the fastening positions P2) of the retainer 150 relative to the engine body 110 are provided at the inner side than the outer edge portion (the flange portions 22) of the TCC 120 which is fastened to the engine body 110. Accordingly, in the same way as the first embodiment, while the retainer 150 is restrained from being enlarged, a displacement amount generated among the fastening positions P2 is restrained from increasing.

In the second embodiment, the TCC 120 is fastened to the engine body 110 at the bolt insertion bores 22a provided at the flange portions 22 of the TCC 120. The retainer 150 is fixed to the engine body 110 at the bolt insertion bores 155 of the fixing portions 152 which are provided closer to the crankshaft 12 than the bolt insertion bores 22a of the flange portions 22. Accordingly, because the retainer 150 is simply provided in the vicinity of the crankshaft 12, in the same manner as the first embodiment, the retainer 150 may be further downsized. Further, being different from a case where the retainer 150 and the TCC 120 are together fastened to the engine body 110, generation of a step at a boundary between the retainer 150 and the TCC 120 resulting from a difference in deformation degree against the fastening may be restrained. Therefore, decrease in sealing ability at the boundary between the retainer 150 and the TCC 120 (between the seal surface 21a and the seal surface 51d) may be restrained. The other effects obtained according to the second embodiment are substantially the same as the first embodiment.

Figure 10:
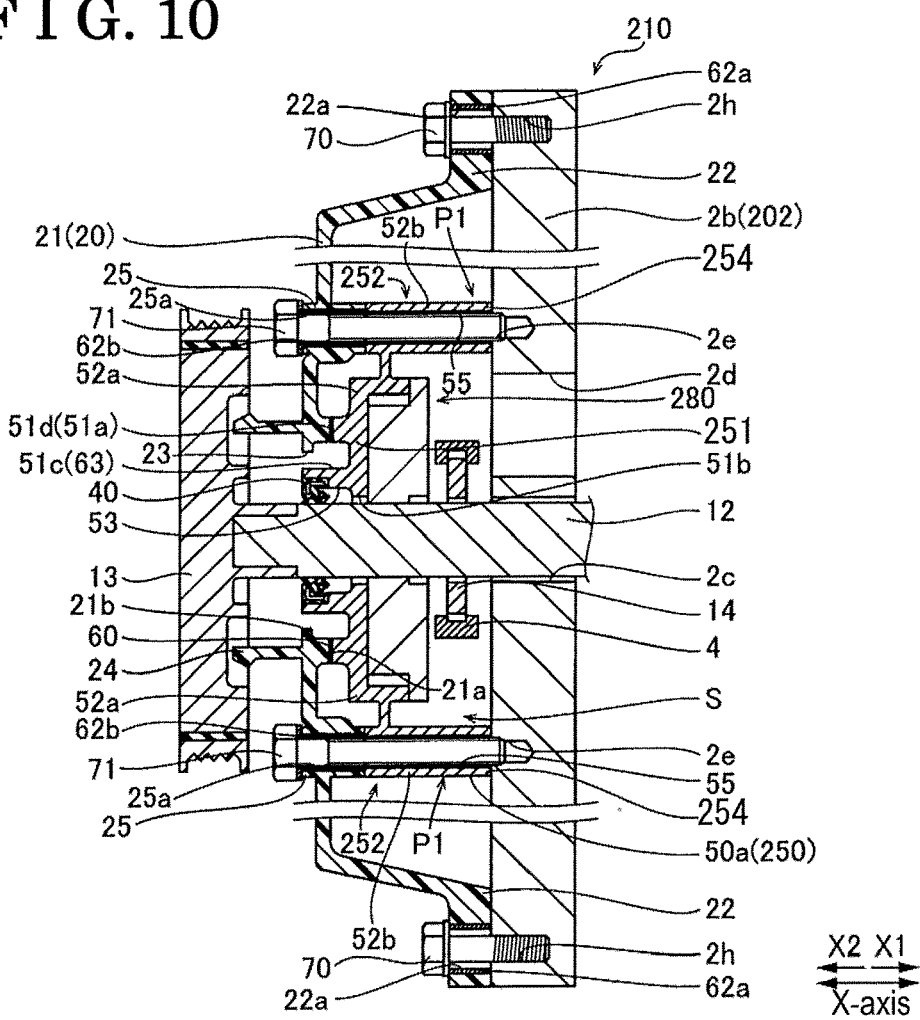
FIG. 10 is an enlarged cross-sectional view around a crankshaft according to a third embodiment disclosed here.

A third embodiment is explained with reference to FIG. 10. In the third embodiment, a construction where an oil pump 280 is mounted at a retainer 250 is added to the construction according to the first embodiment. In FIG. 10, the same constructions as the first embodiment bear the same reference numerals as the first embodiment and explanation is omitted.

As illustrated in FIG. 10, the oil pump 280 serving as an example of a pump portion is mounted at the retainer 250 serving as an example of the oil seal fixing member so as to supply oil to an engine body 210 serving as an example of the internal combustion engine body. The oil pump 280 is mounted at a body portion 251 of the retainer 250 so as to be positioned at the X1 side thereof. Specifically, the oil pump 280 is arranged at the X2 side relative to the chain sprocket 14 within the void S. In addition, a portion of the oil pump 280 at the X2 side is integrally provided at the body portion 251. As a result, a portion of the retainer 250 at the X1 side may be effectively utilized.

The oil pump 280 is connected to the crankshaft 12 so as to discharge the oil by a drive force of the crankshaft 12.

The retainer 250 includes fixing portions 252 at which positioning holes are not provided, which is different from the first embodiment. Thus, a contact portion 254 of each of the fixing portions 252 may be reduced in size. A cylinder block 202 of the engine body 210 also does not include positioning holes. The other construction of the third embodiment is substantially the same as the first embodiment.

According to the third embodiment, as mentioned above, the oil pump 280 is assembled on the retainer 250. Because the oil pump 280 is arranged within the engine, i.e., at the inner portion of the TCC 20 closer to the engine body 10 (i.e., at the X1 side), a foreign substance from the engine outside is restrained from hitting the oil pump 280. The oil pump 280 is thus restrained from being damaged. The other effects of the third embodiment are substantially the same as the first embodiment.

The aforementioned embodiments are explained as examples and are not restrictive. In addition, the embodiments may be appropriately changed or modified as follows, for example.

In the first to third embodiments, the retainer 50, 150, 250 is fastened and fixed to the engine body 10, 110, 210 at the three fastening positions P1, P2 provided at the substantially equal angular intervals. Instead of the three fastening positions, one, two, four or more than four fastening positions may be provided. In a case where the plural fastening positions are provided, the fastening positions may not be arranged at equal angular intervals. In order to obtain stable fastening, the number of fastening positions may be desirably three or more than three. At this time, in order to restrain a fastening operation from increasing, the number of fastening positions should not be extremely large.

In the first to third embodiments, the retainer 50, 150, 250 serving as the oil seal fixing member is made of aluminum alloy. Alternatively, the oil seal fixing member may be made of metallic material except for the aluminum alloy. The oil seal fixing member may be also made of resin material which ensures predetermined rigidity.

In the first to third embodiments, the TCC 20, 120 serving as the cover member is made of resin. Alternatively, the cover member may be made of metallic material such as aluminum alloy, for example, other than the resin material.

In the third embodiment, the oil pump 280 serving as the pump portion is additionally provided to the construction (specifically, the construction according to the first embodiment) where the TCC 20 and the retainer 250 are fastened together to the engine body 210. Alternatively, the pump portion may be additionally provided to the construction where the TCC 120 and the retainer 150 are separately fixed to the engine body 110 as in the second embodiment.

In the first to third embodiments, the seal portion 60 is obtained by solidification of liquid seal material. Alternatively, the seal portion may be obtained by rubber gasket. In this case, the seal material restriction portion is not necessary, which may simplify the construction of the oil seal fixing member and the construction of the cover member. In addition, because it is not necessary to wait solidification of the seal material in liquid form, takt time may be reduced. Further, even in a case where the seal material in liquid form is employed as the seal portion, the seal material restriction portion may not be necessarily provided.

In the first and third embodiments, the circumferential wall portion 24 serving as the restriction portion is provided at the TCC 20 (the cover member) and the labyrinth structure is provided by the damper pulley 13 and the circumferential wall portion 24 so as to restrict the foreign substance from the outside from entering the retainer 50, 250 provided at the inner portion of the TCC 20. Alternatively, the restriction portion including the labyrinth structure may be provided at the cover member so as to restrict the foreign substance from the outside is restrained from entering the oil seal fixing member at the inside of the cover member. That is, the labyrinth structure may be obtained only by the restriction portion. Further, the restriction portion may not be integrally provided at the cover member. That is, the internal combustion engine may be constructed so that the restriction portion which is separately provided from the cover member is screwed, for example, to be fixed to the cover member.

In the first to third embodiments, the flange portions 21c and 21d of the TCC 20, 120 may be fixed to the flange portions 3c and 5a with a fastening member such as a bolt in a state where the flange portions 21c and 21d are in contact with the flange portions 3c and 5a, respectively.

According to the aforementioned embodiments, the following constructions may be considered.

In the internal combustion engine where the fixing positions are arranged at the plural intervals with the predetermined angle, the number of fixing positions is at least three.

In the internal combustion engine, the oil seal fixing member is made of metal and the cover member is made of resin.

According to the aforementioned first to third embodiments, the internal combustion engine 100, 200 includes the oil seal 40 mounted at the crankshaft 12 of the internal combustion engine body 10, 110, 210 to restrain leakage of oil to the outside of the internal combustion engine 100, 200, the retainer 50, 150, 250 (oil seal fixing member) fixed to the internal combustion engine body 10, 110, 210 to fix the oil seal 40 to the internal combustion engine body 10, 110, 210, and the TCC 20, 120 (cover member) assembled on the lateral surface portion 2b of the internal combustion engine body 10, 110, 210 in the direction in which the crankshaft 12 extends, the TCC 20, 120 covering the retainer 50, 150, 250 from a side opposite to the internal combustion engine body 10, 110, 210. The retainer 50, 150, 250 is fixed to the internal combustion engine body 10, 110, 210 at the fixing position P1, P2 which is provided at the inner side than the outer edge portion (flange portions 22) of the TCC 20, 120 fastened to the internal combustion engine body 10, 110, 210.

In addition, according to the first to third embodiments, the retainer 50, 150, 250 includes the outer edge portion which is positioned at the inner side than the outer edge portion of the TCC 20, 120 as viewed from the lateral side in the direction in which the crankshaft 12 extends.

Further, according to the first to third embodiments, the TCC 20, 120 includes the bolt insertion bores 22a (cover member fastening portion) at the outer edge portion, the bolt insertion bores 22a at which the TCC 20, 120 is fastened to the internal combustion engine body 10, 110, 210. The retainer 50, 150, 250 includes the bolt insertion bores 55 (fixing member fastening portion) provided closer to the crankshaft 12 than the bolt insertion bores 22a, the bolt insertion bores 55 at which the retainer 50, 150, 250 is fastened to the internal combustion engine body 10, 110, 210.

Furthermore, according to the first to third embodiments, the retainer 50, 250 (oil seal fixing member) is fixed to the TCC 20 (cover member) and the internal combustion engine body 10, 210 in a state being fastened together with the TCC 20 to the internal combustion engine body 10, 210 at the bolt insertion bores 55 (fixing member fastening portion).

The retainer 50, 150, 250 (oil seal fixing member) includes the positioning hole 56 (positioning portion) provided in the vicinity of the bolt insertion bores 55 (fixing member fastening portion) to position the retainer 50, 150, 250 relative to the internal combustion engine body 10, 110, 210.

Furthermore, according to the third embodiment, the oil pump 280 (pump portion) which supplies oil to the internal combustion engine body 210 is assembled on the retainer 250 (oil seal fixing member).

Furthermore, according to the first to third embodiments, the retainer 50, 150, 250 (oil seal fixing member) is provided surrounding the chain sprocket 14 (timing member engagement portion) with which the timing chain 4 (timing member) that transmits power from the crankshaft 12 to the camshaft 15 engages and which is mounted at the crankshaft 12 as viewed from the lateral side in the direction in which the crankshaft 12 extends.

Furthermore, according to the first to third embodiments, the fixing position of the retainer 50, 150, 250 (oil seal fixing member) relative to the internal combustion engine body includes the plural fixing positions P1, P2 arranged at plural intervals with a predetermined angle around the chain sprocket 14 (timing member engagement portion) as viewed from the lateral side.

Furthermore, according to the first to third embodiments, the TCC 20, 120 (cover member) is made of resin, the TCC 20, 120 made of resin integrally including the circumferential wall portion 24 (restriction portion) restricting a foreign substance from entering the retainer 50, 150, 250 (oil seal fixing member).

Furthermore, according to the first to third embodiments, the restriction portion includes the circumferential wall portion 24 protruding to the opposite side to the lateral surface portion 2b of the internal combustion engine body 10, 110, 210.

Furthermore, according to the first to third embodiments, the internal combustion engine 100, 200 further includes the seal portion 60 disposed between the seal surface 21a of the TCC 20, 120 (cover member) and the seal surface 51d of the retainer 50, 150, 250 (oil seal fixing member) and obtained by a solidification of a seal material in liquid form, and the circumferential storage portion 63 (seal material restriction portion) restricting the seal material in liquid form from flowing out to the outer surface side of the TCC 20, 120.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An internal combustion engine comprising:
an oil seal mounted at a crankshaft of an internal combustion engine body to restrain leakage of oil to an outside of the internal combustion engine;
an oil seal fixing member fixed to the internal combustion engine body to fix the oil seal to the internal combustion engine body; and
a cover member assembled on a lateral surface portion of the internal combustion engine body in a direction in which the crankshaft extends, the cover member covering the oil seal fixing member from a side opposite to the internal combustion engine body,
the oil seal fixing member being fixed to the internal combustion engine body at a fixing position which is provided at an inner side than an outer edge portion of the cover member fastened to the internal combustion engine body, wherein the cover member includes a cover member fastening portion at the outer edge portion, the cover member fastening portion at which the cover member is fastened to the internal combustion engine body, and the oil seal fixing member includes a fixing member fastening portion provided closer to the crankshaft than the cover member fastening portion, the fixing member fastening portion at which the oil seal fixing member is fastened to the internal combustion engine body.

2. The internal combustion engine according to claim 1, wherein the oil seal fixing member includes an outer edge portion which is positioned at an inner side than the outer edge portion of the cover member as viewed from a lateral side in the direction in which the crankshaft extends.

3. The internal combustion engine according to claim 2, wherein a pump portion which supplies oil to the internal combustion engine body is assembled on the oil seal fixing member.

4. The internal combustion engine according to claim 1, wherein the oil seal fixing member is fixed to the cover member and the internal combustion engine body in a state being fastened together with the cover member to the internal combustion engine body at the fixing member fastening portion.

5. The internal combustion engine according to claim 1, wherein the oil seal fixing member includes a positioning portion provided in a vicinity of the fixing member fastening portion to position the oil seal fixing member relative to the internal combustion engine body.

6. The internal combustion engine according to claim 1, wherein a pump portion which supplies oil to the internal combustion engine body is assembled on the oil seal fixing member.

7. The internal combustion engine according to claim 1, wherein the oil seal fixing member is provided surrounding a timing member engagement portion with which a timing member that transmits power from the crankshaft to a camshaft engages and which is mounted at the crankshaft as viewed from a lateral side in the direction in which the crankshaft extends.

8. The internal combustion engine according to claim 7, wherein the fixing position of the oil seal fixing member relative to the internal combustion engine body includes a plurality of the fixing positions arranged at plural intervals with a predetermined angle around the timing member engagement portion as viewed from the lateral side.

9. The internal combustion engine according to claim 1, wherein the cover member is made of resin, the cover member made of resin integrally including a restriction portion restricting a foreign substance from entering the oil seal fixing member.

10. The internal combustion engine according to claim 9, wherein the restriction portion includes a circumferential wall portion protruding to an opposite side to the lateral surface portion of the internal combustion engine body.

11. The internal combustion engine according to claim 1, further comprising a seal portion disposed between a seal surface of the cover member and a seal surface of the oil seal fixing member and obtained by a solidification of a seal material in liquid form, and a seal material restriction portion restricting the seal material in liquid form from flowing out to an outer surface side of the cover member.

\* \* \* \* \*